United States Patent
Han et al.

(10) Patent No.: US 8,849,668 B2
(45) Date of Patent: Sep. 30, 2014

(54) SPEECH RECOGNITION APPARATUS AND METHOD

(75) Inventors: Ick-Sang Han, Yongin-si (KR);
Chi-Youn Park, Suwon-si (KR);
Jeong-Su Kim, Yongin-si (KR);
Jeong-Mi Cho, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 570 days.

(21) Appl. No.: 13/114,741

(22) Filed: May 24, 2011

(65) Prior Publication Data
US 2012/0095766 A1    Apr. 19, 2012

(30) Foreign Application Priority Data
Oct. 13, 2010    (KR) .................... 10-2010-0099828

(51) Int. Cl.
*G10L 15/28*    (2013.01)
(52) U.S. Cl.
USPC ........................... 704/255; 704/242; 704/235
(58) Field of Classification Search
USPC ............... 704/1–10, 240–242, 257, 231, 235, 704/251–255
See application file for complete search history.

(56) References Cited

U.S. PATENT DOCUMENTS

| | | | | |
|---|---|---|---|---|
| 5,621,859 | A * | 4/1997 | Schwartz et al. | 704/256 |
| 7,092,883 | B1 * | 8/2006 | Gretter et al. | 704/242 |
| 7,890,325 | B2 * | 2/2011 | Liu et al. | 704/240 |
| 8,301,449 | B2 * | 10/2012 | He et al. | 704/257 |

* cited by examiner

*Primary Examiner* — Huyen X. Vo
(74) *Attorney, Agent, or Firm* — NSIP Law

(57) ABSTRACT

A speech recognition apparatus is provided. The speech recognition apparatus includes a primary speech recognition unit configured to perform speech recognition on input speech and thus to generate word lattice information, a word string generation unit configured to generate one or more word strings based on the word lattice information, a language model score calculation unit configured to calculate bidirectional language model scores of the generated word strings selectively using forward and backward language models for each of words in each of the generated word strings, and a sentence output unit configured to output one or more of the generated word strings with high scores as results of the speech recognition of the input speech based on the calculated bidirectional language model scores.

20 Claims, 9 Drawing Sheets

United States Patent 8,849,668 B2

SPEECH RECOGNITION APPARATUS AND METHOD

CROSS-REFERENCE TO RELATED APPLICATION(S)

This application claims the benefit under 35 U.S.C. §119(a) of Korean Patent Application No. 10-2010-0099828, filed on Oct. 13, 2010, in the Korean Intellectual Property Office, the entire disclosure of which is incorporated herein by reference for all purposes.

BACKGROUND

1. Field

The following description relates to a speech recognition apparatus and method.

2. Description of the Related Art

The application of voice interactive systems has been relatively limited to telephone network-based simple systems such as airplane/train ticket reservation systems, and speech recognition techniques used in such voice interactive systems simply can recognize isolated words, only a limited number of words or a limited grammar. However, an ever-increasing need for control of a considerable amount of multimedia content and recent developments in speech recognition systems have paved the way for supporting not only isolated speech recognition but also continuous speech recognition, and thus, users increasingly expect to be able to enter speech inputs using a variety of natural expressions, rather than using a limited number of predefined voice commands.

Continuous speech recognition systems generate sentences by combining words that are determined to match input speech. However, a number of words that are determined to match the input speech may increase considerably 1) due to variations in pronunciation from speaker to speaker or 2) from context to context and distortions caused by, for example, surrounding noise. Thus, a number of sentences generated based on the words that are determined to match the input speech may increase exponentially. Accordingly, a considerable amount of computation may generally be required to search for a sentence that most closely matches the input speech. In continuous speech recognition, in order to reduce the amount of computation and speed up a search for a matching sentence for the input speech, the number of words subject to searching may be reduced using various language models that model the relationships between words in the input speech.

Language models probabilistically model the relationships between words that can be used in connection with one another in speech based on various sentence data. Theoretically, language models exclude improper combinations of words, and analyze the probabilities of proper combinations of words. However, in reality, it is impossible to provide all sentences that can be said by users in the language models as the sentence data. Thus, combinations of words that are not frequently used may be mistakenly determined to be improper, thereby causing a problem of data sparseness.

The problem of data sparseness arises mainly due to the characteristics of conventional language models. More specifically, the conventional language models model probabilities of combinations of words. However, when a number of words that should be taken into consideration exceeds a certain level, it is almost impossible to model probabilities of all combinations of words. In order to address this problem, class-based language models that group words often used in similar contexts as a class are used. That is, a class 'fruit' is used instead of individual words such as 'apple' and 'pear.'

In addition, the conventional language models mostly model probabilities of combinations of words adjacent in speech. However, in reality, even words distant from each other in speech are often highly correlated, for example, when interjections or adverbs are inserted into sentences. Thus, in order to avoid this problem, co-occurrence language models, which are capable of considering combinations of words that are not directly adjacent but a few words apart from each other, have been introduced.

Moreover, the conventional language models model the relationship between words in speech, taking only one direction in consideration. Most language models predict what word will follow a particular word in speech over a course of time and can thus simplify modeling and decoding processes. However, since a word that follows another word in input speech is not always influenced by its previous word, a failure to predict a word that will follow a particular word in the input speech may result in a failure to compose a whole sentence that matches the input speech or properly recognize the input speech.

SUMMARY

The following description relates to a speech recognition apparatus and method capable of precisely recognizing utterances that are even not grammatically correct in terms of a predefined limited grammar, in consideration of a bidirectional relationship between adjacent words in the utterances.

In one general aspect, a speech recognition apparatus is provided. The speech recognition apparatus includes a primary speech recognition unit configured to perform speech recognition on input speech and thus to generate word lattice information, a word string generation unit configured to generate one or more word strings based on the word lattice information, a language model score calculation unit configured to calculate bidirectional language model scores of the generated word strings selectively using forward and backward language models for each of words in each of the generated word strings, and a sentence output unit configured to output one or more of the generated word strings with high scores as results of the speech recognition of the input speech based on the calculated bidirectional language model scores.

The language model score calculation unit may include a language model selector configured to select one of the forward and backward language models for each of the words in each of the generated word strings, and a score calculator configured to calculate the bidirectional language model scores of the generated word strings selectively using the forward and backward language models for each of the words in each of the generated word strings.

The language model selector may be further configured to calculate forward and backward language model scores of each of the words in each of the generated word strings using the forward and backward language models, respectively, and to select whichever of the forward and backward language models produces a higher language model score for each of the words in each of the generated word strings.

In response to a predefined condition, the language model selector may be further configured to prioritize the predefined condition over the forward and backward language model scores and to select one of the forward and backward language models for each of the words in each of the generated word strings based on the predefined condition.

The predefined condition may include a condition that the forward or backward language model be selected for use for particular words or for words having particular morphemes.

The language model score calculation unit may be further configured to calculate the language model score of each of the generated word strings by adding up the forward or backward language model scores of each of the words in the corresponding word string that is selected.

In response to a word string having a cyclic dependency between first and second words thereof among the generated word strings, the language model score calculation unit may be further configured to remove the cyclic dependency between the first and second words and to calculate a language model score of the word string including the first and second words.

The language model score calculation unit may be further configured to calculate the language model score of the word including the first and second words using first and second methods, respectively, and select whichever of the first and second methods produces a higher language model score than the other method for the word string including the first and second words to remove the cyclic dependency between the first and second words, the first method including applying the backward language model to the first word and applying a unigram model to the second word, and the second method including applying the unigram model to the first word and applying the forward language model to the second word.

The sentence output unit may be further configured to calculate acoustic model scores of the generated word strings in consideration of a liaison between the words in each of the generated word strings, add up the acoustic model scores and the bidirectional language model scores of the generated word strings to calculate integrated scores of the generated word strings, select one or more word strings with high integrated scores from the generated word strings, and output the selected word strings as the results of the speech recognition of the input speech.

Each unit may be implemented by a processor.

The forward language model may include probability information indicating a probability that a word in a word string will be followed, in a forward direction, be a particular word.

In another general aspect, a speech recognition method is provided. The speech recognition method includes generating word lattice information by performing speech recognition on input speech, generating one or more word strings based on the word lattice information, calculating bidirectional language model scores of the generated word strings selectively using forward and backward language models for each of words in each of the generated word strings, and outputting one or more of the generated word strings with high scores as results of the speech recognition of the input speech based on the calculated bidirectional language model scores. Each of the generating, the calculating, and the outputting is performed by a processor.

The calculating the bidirectional language model scores may include selecting one of the forward and backward language models for each of the words in each of the generated word strings, and calculating the bidirectional language model scores of the generated word strings selectively using the forward and backward language models for each of the words in each of the generated word strings.

The selecting one of the forward and backward language models may include calculating forward and backward language model scores of each of the words in each of the generated word strings using the forward and backward language models, respectively, and choosing whichever of the forward and backward language models produces a higher language model score for each of the words in each of the generated word strings.

The selecting one of the forward and backward language models may include, in response to a predefined condition, prioritizing the predefined condition over the forward and backward language model scores and selecting one of the forward and backward language models for each of the words in each of the generated word strings based on the predefined condition.

The calculating the bidirectional language model scores of the generated word strings may include calculating the language model score of each of the generated word strings by adding up the forward or backward language model scores of each of the words in the corresponding word string that is selected.

The calculating the bidirectional language model scores of the generated word strings may include determining whether there is a word string having a cyclic dependency between first and second words thereof among the generated word strings, in response to a word string having a cyclic dependency between first and second words thereof among the generated word strings, removing the cyclic dependency between the first and second words and calculating a language model score of the word string including the first and second words.

The removing the cyclic dependency between the first and second words may include calculating the language model score of the word including the first and second words using first and second methods, respectively, and choosing whichever of the first and second methods produces a higher language model score than the other method for the word string including the first and second words to remove the cyclic dependency between the first and second words, the first method including applying the backward language model to the first word and applying a unigram model to the second word, and the second method including applying the unigram model to the first word and applying the forward language model to the second word.

The outputting the word strings with high scores may include calculating acoustic model scores of the generated word strings in consideration of a liaison between the words in each of the generated word strings, adding up the acoustic model scores and the bidirectional language model scores of the generated word strings to calculate integrated scores of the generated word strings, and selecting one or more word strings with high integrated scores from the generated word strings and outputting the selected word strings as the results of the recognition of the input speech.

The backward language model may include probability information indicating a probability that a word in a word string will be followed, in a backward direction, be a particular word.

Other features and aspects may be apparent from the following detailed description, the drawings, and the claims.

Figure 1:
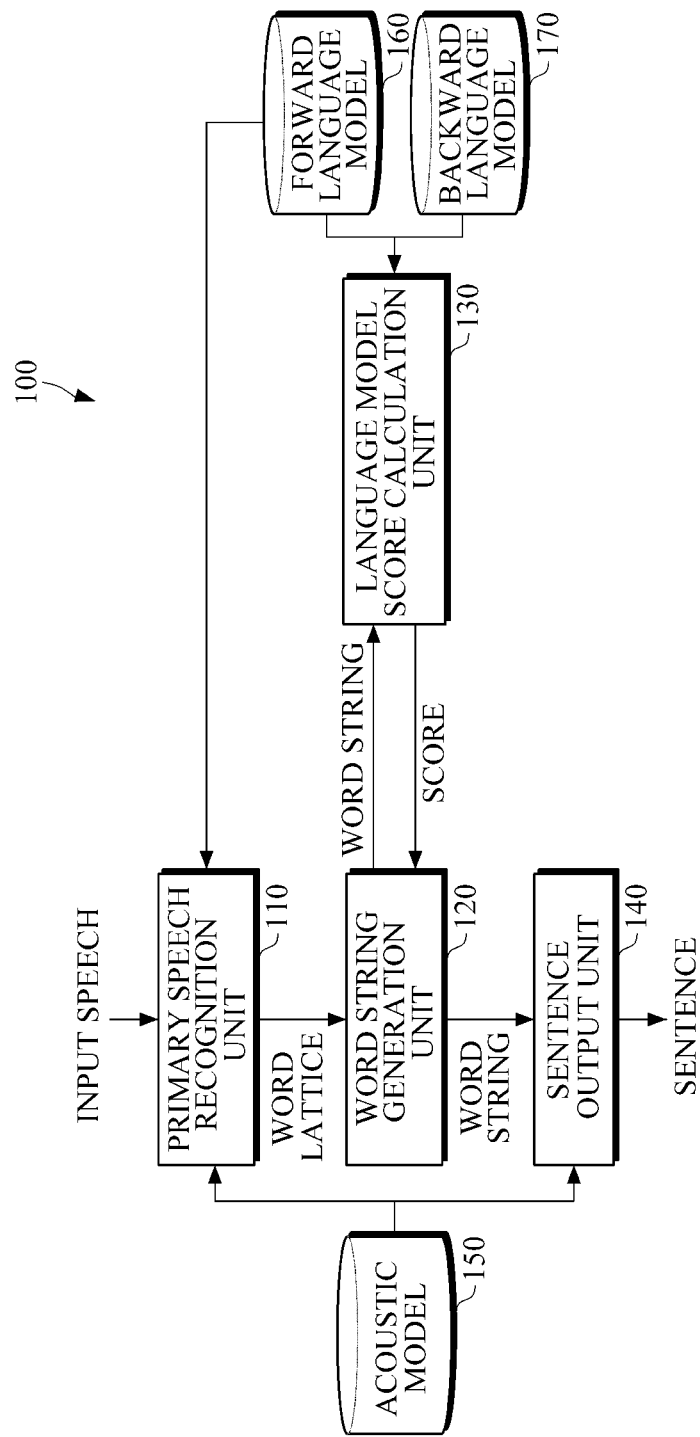
FIG. 1 is a diagram illustrating an example of a speech recognition apparatus for recognizing speech using forward and backward language models.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates an example of a speech recognition apparatus for recognizing speech using forward and backward language models.

Referring to FIG. 1, a speech recognition apparatus 100 includes a primary speech recognition unit 110, a word string generation unit 120, a language model score calculation unit 130, a sentence output unit 140, an acoustic model 150, a forward language model 160, and a backward language model 170.

The acoustic model 150 may be a model specifying characteristics of audio signals. The forward and backward language models 160 and 170 may be 1) statistics-based language models such as an n-gram language model or 2) grammar-based language models such as a context-free grammar language model. Alternatively, the forward and backward language models 160 and 170 may be a combination of a statistics-based language model and a grammar-based language model. The forward language model 160 may include probability information indicating a probability that a word in a word string will be followed, in a forward direction (or in a left-to-right direction), by a particular word. The backward language model 170 may include probability information indicating a probability that a word in a word string will be followed, in a backward direction (or in a right-to-left direction), by a particular word.

The primary speech recognition unit 110 may perform continuous speech recognition on input speech, thereby generating word lattice information including a number of target words. The primary speech recognition unit 110 may generate word lattice information on the input speech using the acoustic model 150 and the forward language model 160. Continuous speech recognition is a process of recognizing speech in units of sentences.

For example, the primary speech recognition unit 110 1) may convert the input speech into a plurality of frames, 2) may convert the frames into frequency band signals, 3) may extract feature information from the frequency band signals, and 4) may generate a text string using the feature information and the acoustic model 150. Thereafter, the primary speech recognition unit 110 may generate the word lattice information using the forward language model 160, which specifies target words and the relationships between the target words.

The primary speech recognition unit 110 may output the word lattice information as a result of a recognition of the input speech. The word lattice information may include a plurality of word branches. Each of the word branches may include a word, an identifier of the word, positions of beginning and end frames for the word, and an acoustic model score of the word.

The primary speech recognition unit 110 may generate the word lattice information using the same method used for a typical continuous speech recognition apparatus to generate word lattice information. The primary speech recognition unit 110 may be configured to integrate 1) keyword lattice information, which is obtained by performing a keyword-based speech recognition on the input speech, and 2) the word lattice information, which is obtained by performing a typical continuous speech recognition on the input speech, and thus to output integrated word lattice information. In this manner, it may be possible to add word branches that cannot be generated using a single word lattice generation module to the word lattice information.

The word string generation unit 120 may generate at least one word string by combining a plurality of word lattices together based on the word lattice information provided by the primary speech recognition unit 110. For example, the word string generation unit 120 may combine the word lattices together and may thus generate a plurality of word strings for a sentence to be generated as a result of the recognition of the input speech.

The word string generation unit 120 may generate a word string based on the recognized word lattices using a stack search technique (or a stack decoding algorithm) such as an A* search, given that it may be very time consuming and may offer little value to consider all possible word strings that may be generated based on the word lattice information.

The word string generation unit 120 may store a word string corresponding a part of the input speech in a stack using a stack search technique and may then expand the word string by 1) selecting words, from the word lattice information generated by the primary speech recognition unit 110, that can be connected next to one another to the word string and 2) adding the selected words to the word string. The word string generation unit 120 may sort and store the word string in the stack in order of score using a stack search. The word string generation unit 120 may continue to perform a stack search until the word string is expanded to cover the whole input speech.

When the word string in the stack in the word string generation unit 120 is expanded to cover the whole input speech, the word string generation unit 120 may transmit the corresponding word string, i.e., a sentence, to the sentence output unit 140. In order to speed up computation, the stack in the word string generation unit 120 may be limited to a predetermined size or less.

The language model score calculation unit 130 may calculate the bidirectional language model score of at least one word string input thereto by the word string generation unit 120 using the forward and backward language models 160 and 170. The language model score calculation unit 130 may calculate the bidirectional language model score of words in the input word string using the forward and backward language models 160 and 170.

When the input word string is a string of first and second words, the forward language model score of the input word string may be a probability that the second word will appear next to the first word in speech, and the backward language model score of the input word string may be a probability that the first word will appear before the second word in speech.

The language model score calculation unit 130 may calculate the forward- and backward-language model scores of each of the words in the input word string, and may select the forward or backward language models 160 or 170 that produces a higher score for each of the words in the input word string, i.e., the forward- or backward-language model scores of each of the words in the input word string that is higher. Thereafter, the language model score calculation unit 130 may calculate the bidirectional language model score of the input word string by adding up the selected language model scores of the words in the input word string. Thus, the bidirectional language model score of the input word string may include both forward- and backward-language model scores, which are obtained using the forward and backward language models 160 and 170, respectively.

The language model score calculation unit 130 may calculate the bidirectional language model score of a word string in the stack in the word string generation unit 120 whenever a new word is added to the corresponding stack, and may continue to calculate the bidirectional language model score of the word string until the word string is expanded enough to cover the whole input speech. Alternatively, the language model score calculation unit 130 may perform the calculation of a bidirectional language model score whenever a new word string is input thereto by the word string generation unit 120.

The sentence output unit 140 may be configured to output a word string having a high bidirectional language model score as a result of the recognition of the input speech. The sentence output unit 140 may calculate the integrated scores of a plurality of candidate word strings for the input speech by integrating 1) their bidirectional language model scores, which are provided by the language model score calculation unit 130, and 2) their acoustic model scores, which are calculated in consideration of a relationship between pronunciations of words, and may output one or more of the candidate word strings (or sentences) with high integrated scores as results of the recognition of the input speech.

The speech recognition apparatus 100 may be implemented as an interactive voice user interface that can be embedded in various electronic products such as multimedia devices (for example, TVs or mobile phones), robots or kiosks.

In short, as described above, it is possible to improve a performance of speech recognition by selecting between forward and backward language models for each of the words in a word string and calculating the language model scores of the words in the word string using the selected language model. Therefore, it is possible to precisely recognize utterances that are not even grammatically correct in terms of a predefined grammar in consideration of the bidirectional relationship between words in each of the utterances. That is, it is possible to overcome the limits of speech recognition using a unidirectional language model that often fails to produce a proper sentence based on a combination of words that can be represented successfully simply using a given corpus.

Figure 2:
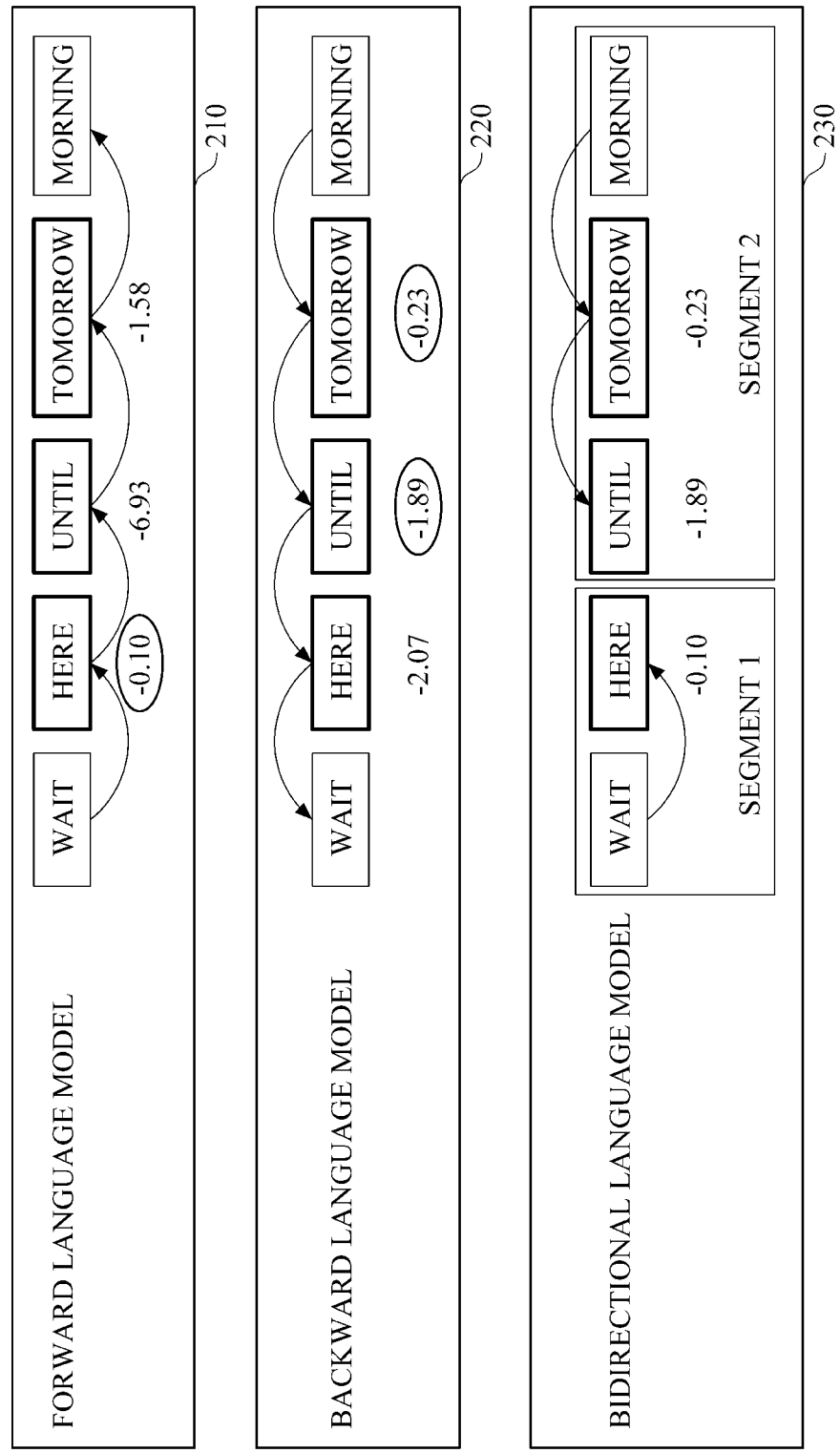
FIG. 2 is a diagram illustrating a concept of a bidirectional language model score.

FIG. 2 illustrates the concept of a bidirectional language model score.

Referring to FIG. 1, the language model score calculation unit 130 calculates the bidirectional language model score of a word string by combining the language model scores of words in the word string using the forward language model 160 and the language model scores of the words using the backward language model 170.

FIG. 2 compares the results of applying the forward and backward language models 160 and 170 to the words "here," "until," and "tomorrow" in the sentence "Wait here until tomorrow morning." Referring to block 210 of FIG. 2, in the case of applying the forward language model 160 to the sentence "Wait here until tomorrow morning," the probability that the word "here" will appear next to the word "wait" in speech is −0.10, the probability that the word "until" will appear next to the word "here" in speech is −6.93, and the probability that the word "morning" will appear next to the word "tomorrow" in speech is −1.58, wherein the numeric values of −0.10, −6.93, and −1.58 are logarithmic values of the forward language model probabilities of the words "here," "until," and "tomorrow."

Referring to block 220 of FIG. 2, in the case of applying the backward language model 170 to the sentence "Wait here until tomorrow morning," the probability that the word "tomorrow" will appear before the word "morning" in speech is −0.23, the probability that the word "until" will appear before the word "tomorrow" in speech is −1.89, and the probability that the word "here" will appear before the word "until" in speech is −2.07, wherein the numeric values of −0.23, −1.89, and −2.07 are logarithmic values of the backward language model probabilities of the words "tomorrow," "until," and "here."

Referring to block 230 of FIG. 2, whichever of the forward and backward language model scores of each of the words "here," "until," and "tomorrow" is higher than the other language model score may be chosen as the language model score of the corresponding word.

For example, since the probability that the word "until" will appear next to the word "here" in speech is as low as −6.93, as shown in block 210, the probability of the recognition of the word "until" may also be very low. However, since the probability that the word "until" will appear before the word "tomorrow" in speech is −1.89, as shown in block 220, the word "until" may become more likely to be recognized correctly when taking into consideration the words following the word "until" using the backward language model 170 than when using the forward language model 160 only. In short, it is possible to recognize a variety of utterances using both the forward and backward language models 160 and 170.

Figure 3:
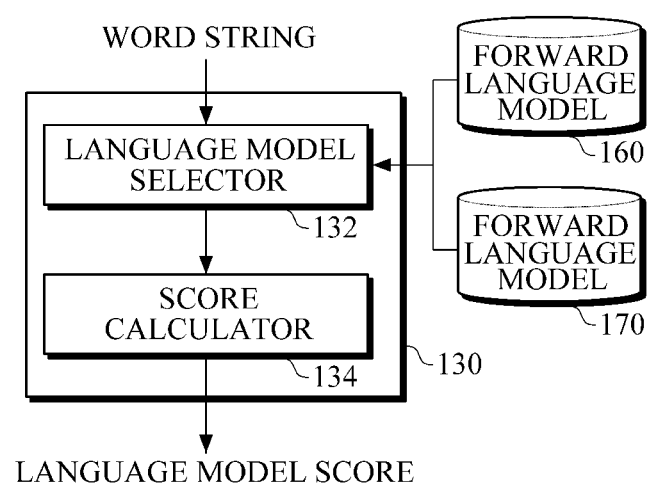
FIG. 3 is a diagram illustrating an example of a language model score calculation unit shown in FIG. 1.

FIG. 3 illustrates an example of the language model score calculation unit 130 shown in FIG. 1. Referring to FIG. 3, the language model score calculation unit 130 may calculate the bidirectional language model score of a word string input thereto. The language model score calculation unit 130 may select one of the forward and backward language models 160 and 170 for each word in the input word string, and may calculate the language model score of each word in the input word string using the forward or backward language models 160 or 170 that is selected for the corresponding word.

The language model score calculation unit 130 may include a language model selector 132 and a score calculator 134.

The language model selector 132 may select one of the forward and backward language models 160 and 170 for each word in the input word string. The language model selector 132 may calculate the forward and backward language model scores of each word in the input word string using the forward and backward language models 160 and 170, respectively, and may select the forward or backward language models 160 or 170 that produces a higher language model score as a language model for the corresponding word.

Referring to block 230 of FIG. 2, the forward language model 160 is selected for the word "here," and the backward language model 170 is selected for the words "until" and "tomorrow."

Choosing between the forward and backward language models 160 and 170 in units of words may result in a segmentation of a word string. Referring to block 230 of FIG. 2, choosing between the forward and backward language models 160 and 170 for each of the words in the sentence "Wait here until tomorrow morning" results in two segments that are not related, i.e., segments 1 and 2. Segments are discrete units of speech. When a probability that adjacent words in a word string will appear in speech in connection with one another is not considered, the words are classified into different segments, and segmentation is a process of segmenting a word string into a plurality of segments. For example, when the forward and backward language models 160 and 170 are selectively applied to a pair of adjacent words w1 and w2, respectively, in a word string as part of applying a bidirectional language model to the word string, the word string may be segmented into a plurality of segments, and the words w1 and w2 may be classified into different segments.

Referring to block 230 of FIG. 2, the sentence "Wait here until tomorrow morning" is segmented into segments 1 and 2, and the words "here" and "until" are classified into segments 1 and 2, respectively. Since the words "here" and "until" are classified into different segments, the probability that the words "here" and "until" will appear in connection with each other is not considered.

When selectively applying the forward and backward language models 160 and 170 to a word string, the relationship between words classified into the same segment may be taken into consideration, but the relationship between segments is not taken too much into consideration. Thus, it is possible to recognize completely new utterances or even utterances that are not properly connected as a whole through segment-by-segment speech recognition. In addition, it is possible to reduce a probability that errors will propagate from one segment to another segment.

The score calculator 134 may calculate the language model score of a word string by adding up whichever of the forward and backward language model scores of each word in the word string is selected by the language model selector 132.

If the word string has a cyclic dependency between the words thereof, the score calculator 134 may remove the cyclic dependency from the word string and may then calculate the language model score of the word string.

Cyclic dependency occurs when the backward language model 170 is selected as the language model for a first word in a word string and the forward language model 160 is selected as the language model for a second word following the first word. In this case, the score calculator 134 may calculate the language model score of the word string using one of the following two methods: 1) apply the backward language model 170 and a unigram language model to the first and second words, respectively, and add up the backward language model score of the first word and the unigram language model score of the second word; or 2) apply the unigram language model and the forward language model 160 to the first and second words, respectively, and add up the unigram language model score of the first word and the forward language model score of the second word.

Figure 4:
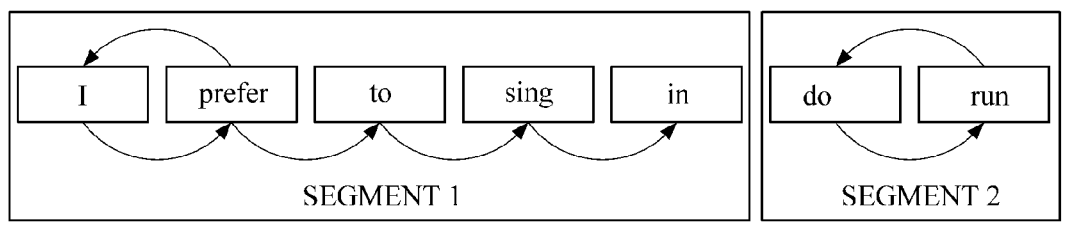
FIG. 4 is a diagram illustrating an example of a wrong segmentation caused by a wrong selection of a language model.

FIG. 4 illustrates an example of a wrong segmentation caused by a wrong selection of a language model. Referring to FIGS. 2 and 4, the segmentation of a word string may result in segments that begin or end with an incomplete phrase.

In order to address this problem, the language model selector 132 may select one of the forward and backward language models 160 and 170 based on a predefined condition, if any, without regard to language model scores. The predefined condition may be a condition that the forward or backward language model 160 or 170 is selected for particular words or for words having particular morphemes.

For example, the language model selector 132 may reduce the probability of an incorrect segmentation of a word string by applying a set of rules that prevent a segmentation of a word string from occurring between a pair of adjacent words dependent on or closely related to each other in terms of grammar, for example, between a dependent noun and an independent noun, between an auxiliary verb and a verb, between a noun and a postposition, or between a preposition and a noun.

For example, when there is a word string including a first word w1 and a second word w2, the language model selector 132 may apply the backward language model 170 to the first word w1 without exception if the first word w1 is dependent on the second word w2 in terms of grammar and thus cannot stand alone without the second word w2. On the other hand, if the second word w2 is dependent on the first word w1 in terms of grammar and thus cannot stand alone without the first word w1, the language model selector 132 may apply the forward language model 160 to the second word w2 without exception. In this example, the language model selector 132 may prevent a wrong segmentation of a word string.

FIG. 4 illustrates an example of a case when the sentence "I prefer to sing in the room" is incorrectly recognized as "I prefer to sing in do run." Referring to FIG. 4, as a result of the selective application of the forward and backward language models 160 and 170 to the words in the sentence "I prefer to sing in do run," the sentence "I prefer to sing in do run" may be segmented into segments 1 and 2, and the words "in" and "do" may be classified into segments 1 and 2, respectively.

However, since the word "in" is a preposition that requires an object and is thus closely related to its subsequent word, the language model selector 132 may apply an additional condition that prevents a segmentation of a word string from occurring between a preposition and a noun to the segmentation of the sentence "I prefer to sing in do run." For example, the language model selector 132 may prevent the sentence "I prefer to sing in do run" from being segmented improperly by applying the forward language model 160 to the word "do" without exception even if the backward language model 170 guarantees a higher language score than the forward language model 160 for the word "do". In this case, the language model score of the sentence "I prefer to sing in do run" may be lower than expected, but the probability of a recognition error may decrease. The language model selector 132 may prevent an incorrect segmentation of a word string by applying various conditions or rules based on the properties of each language.

Figure 5A:
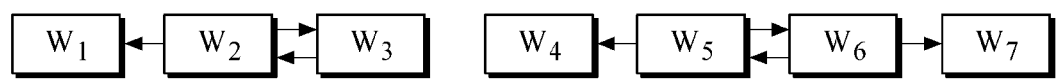
FIGS. 5A through 5C are diagrams illustrating examples of how to calculate the bidirectional language model score of a word string through the removal of a cyclic dependency between words in the word string.
Figure 5B:
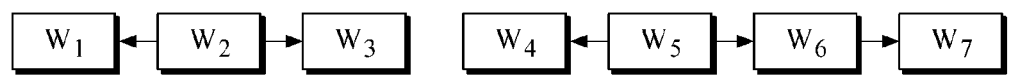
Figure 5C:
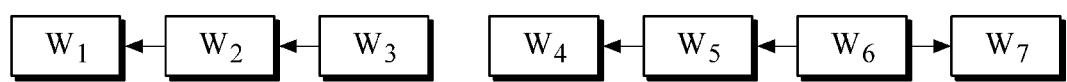

FIGS. 5A through 5C illustrate examples of how to calculate the bidirectional language model score of a word string through the removal of a cyclic dependency, if any, between words in the word string. Referring to FIG. 5A, arrows indicate the forward or backward language model 160 or 170 that is applied. More specifically, right arrows represent the forward language model 160, and left arrows indicate the backward language model 170.

Referring to FIG. 5A, the bidirectional language model score of a word string including first through seventh words $w_1$ through $w_7$ may be calculated using a trigram language model, as indicated by Equation (1):

$$P(w_1,w_2,w_3,w_4,w_5,w_6,w_7)=P(w_1|w_2,w_3)\times P(w_2|w_3,w_4)\times$$
$$P(w_3|w_2,w_1)\times P(w_4|w_5,w_6)\times P(w_5|w_6,w_7)\times P$$
$$(w_6|w_5,w_4)\times P(w_7|w_6,w_5) \qquad (1)$$

where $P(w_1, w_2, w_3, w_4, w_5, w_6, w_7)$ indicates the bidirectional language model score of the word string ($w_1$ through $w_7$), and $P(w_i|w_j,w_k)$ indicates the probability that a word $w_i$ will appear in speech in connection with words $w_j$ and $w_k$. For example, the bidirectional language model score of the word string ($w_1$ through $w_7$) may be calculated by adding up the logarithmic values of the language model scores of the first through seventh words $w_1$ through $w_7$.

Referring to Equation (1), $P(w_1|w_2,w_3)$ may indicate the probability that the first word $w_1$ will appear in speech in connection with the second and third words $w_2$ and $w_3$ when the second and third words $w_2$ and $w_3$ are already known, and $P(w_3|w_2,w_1)$ may indicate the probability that the third word $w_3$ will appear in speech in connection with the second and first words $w_2$ and $w_1$ when the second and first words $w_2$ and $w_1$ are already known. $P(w_1|w_2,w_3)$ and $P(w_3|w_2,w_1)$ may both be high due to a high correlation therebetween even if the first and third words $w_1$ and $w_3$ are not likely to be used together in real speech in terms of the forward and backward language models 160 and 170, i.e., the unigram probabilities of the first and third words $w_1$ and $w_3$ are low. In this case, the relationship between $P(w_1|w_2,w_3)$ and $P(w_3|w_2,w_1)$ is referred to as a cyclic dependency relationship. There is also a cyclic dependency relationship between $P(w_4|w_5,w_6)$ and $P(w_6|w_5,w_4)$ and between $P(w_5|w_6,w_7)$ and $P(w_7|w_6,w_5)$. Thus, the bidirectional language model score of the word string ($w_1$ through $w_7$) may not be properly calculated simply using Equation (1).

The score calculator 134 of the language model score calculation unit 130 may calculate the bidirectional language model score of the word string ($w_1$ through $w_7$) after the removal of cyclic dependencies, if any, from the word string ($w_1$ through $w_7$). The problem of Equation (1) arises due to the cyclic dependencies between the second and third words $w_2$ and $w_3$ and between the fifth and sixth words $w_5$ and $w_6$. Thus, the score calculator 134 may apply only one of the forward and backward language models 160 and 170 to pairs of words having a cyclic dependency therebetween, i.e., the second and third words $w_2$ and $w_3$ and the fifth and sixth words $w_5$ and $w_6$.

FIG. 5B illustrates an example of how to calculate the bidirectional language model of the word string ($w_1$ through $w_7$) by applying the forward language model 160 to all cyclic dependencies, if any, in the word string ($w_1$ through $w_7$). Referring to FIG. 5B, the word string ($w_1$ through $w_7$) has two cyclic dependencies therein, and thus, the score calculator 134 may apply the forward language model 160 to each of the two cyclic dependencies and may apply the unigram probability model to the second and fifth words $w_2$ and $w_5$, which are not dependent on the other words in the word string ($w_1$ through $w_7$). The language model score calculation unit 130 may calculate the bidirectional language model of the word string ($w_1$ through $w_7$), as indicated by a pair of arrows that extend from the second word $w_2$ toward opposite directions and another pair of arrows that extend from the fifth word $w_5$ toward opposite directions. For example, the score calculator 134 may calculate the bidirectional language model score of the word string ($w_1$ through $w_7$), which has two cyclic dependencies therein, by applying the unigram probability model to each of the two cyclic dependencies, as indicated by Equation (2):

$$P(w_1,w_2,w_3,w_4,w_5,w_6,w_7)=P(w_2)\times P(w_1|w_2)\times P(w_3|w_2,$$
$$w_1)\times P(w_5)\times P(w_4|w_5)\times P(w_6|w_5,w_4)\times P(w_7|w_6,w_5) \qquad (2).$$

FIG. 5C illustrates an example of how to calculate the bidirectional language model of a word string having two cyclic dependencies therein by applying the backward language model 170 to each of the two cyclic dependencies. Referring to FIG. 5C, the score calculator 134 may apply the backward language model 170 to each of the two cyclic dependencies in the word string, as indicated by a pair of arrows that extend from the third word $w_3$ toward opposite directions and another pair of arrows that extend from the sixth word $w_6$ toward opposite directions, and may thus calculate the bidirectional language model score of the word string ($w_1$ through $w_7$), as indicated by Equation (3):

$$P(w_1,w_2,w_3,w_4,w_5,w_6,w_7)=P(w_3)\times P(w_2|w_3)\times P(w_1|w_2,$$
$$w_3)\times P(w_6)\times P(w_5|w_6)\times P(w_4|w_5,w_6)\times P(w_7|w_6,w_5) \qquad (3).$$

In short, the calculation of the bidirectional language model score of a word string may be performed in various manners according to the forward or backward language models 160 or 170 that is selected for use. The score calculator 134 may apply both the forward and backward language models 160 and 170 to a word string having a cyclic dependency therein, and may calculate the bidirectional language model score of the word string by selecting one of the forward and backward language models 160 and 170 producing a higher language model score than the other language model.

Figure 6:
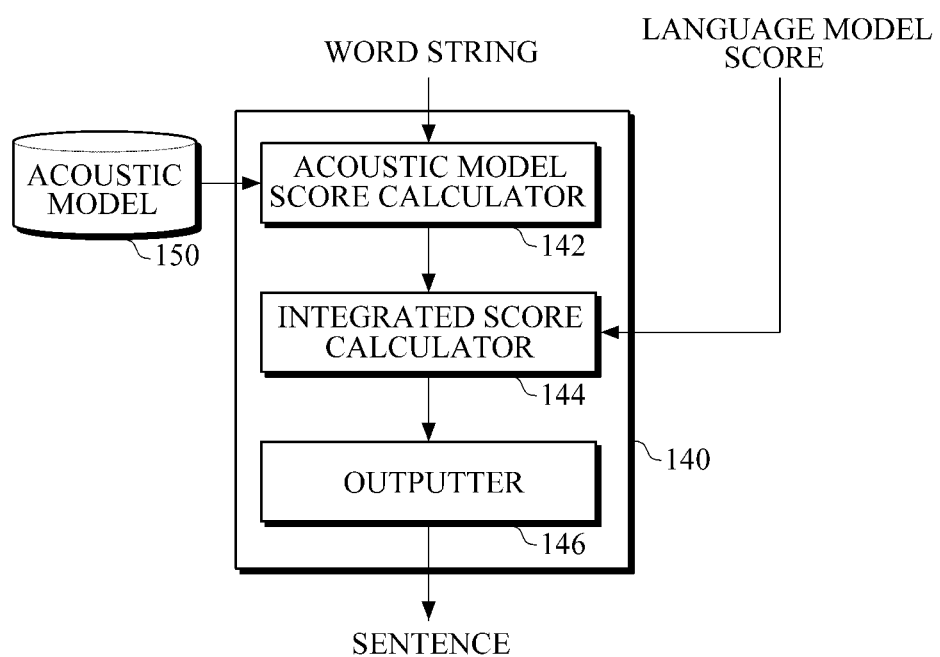
FIG. 6 is a diagram illustrating an example of a sentence output unit shown in FIG. 1.

FIG. 6 illustrates an example of the sentence output unit 140 shown in FIG. 1. Referring to FIG. 6, the sentence output unit 140 may include an acoustic model score calculator 142, an integrated score calculator 144 and an outputter 146.

The primary speech recognition unit 110 calculates the acoustic model scores of words in an input word string, whereas the acoustic model score calculator 142 of the sentence output unit 140 calculates the acoustic model score of the input word string in consideration of the relationship between the words in the input word string. For example, the acoustic model score calculator 142 may calculate the acoustic model score of the input word string in consideration of a liaison, if any, between the words in the input word string.

The integrated score calculator 144 may calculate the integrated score of the input word string by adding up the acoustic model score and the bidirectional language model score of the input word string, which are provided by the acoustic model score calculator 142 and the bidirectional language model score calculation unit 130, respectively. The acoustic model score and the bidirectional language model score of the input word string may be the logarithmic values of the probabilities of the input word string calculated using the acoustic model and using the forward and backward language models 160 and 170. The integrated score calculator 144 1) may apply different weights to the acoustic model score and the bidirectional language model score of the input word string and 2) may thus adjust the ratio between the acoustic model score and the bidirectional language model score of the input word string in the integrated score of the input word string.

The outputter 146 may output a sentence having a highest integrated score or more than one sentence having relatively high integrated scores as results of the recognition of the input word string.

Figure 7:
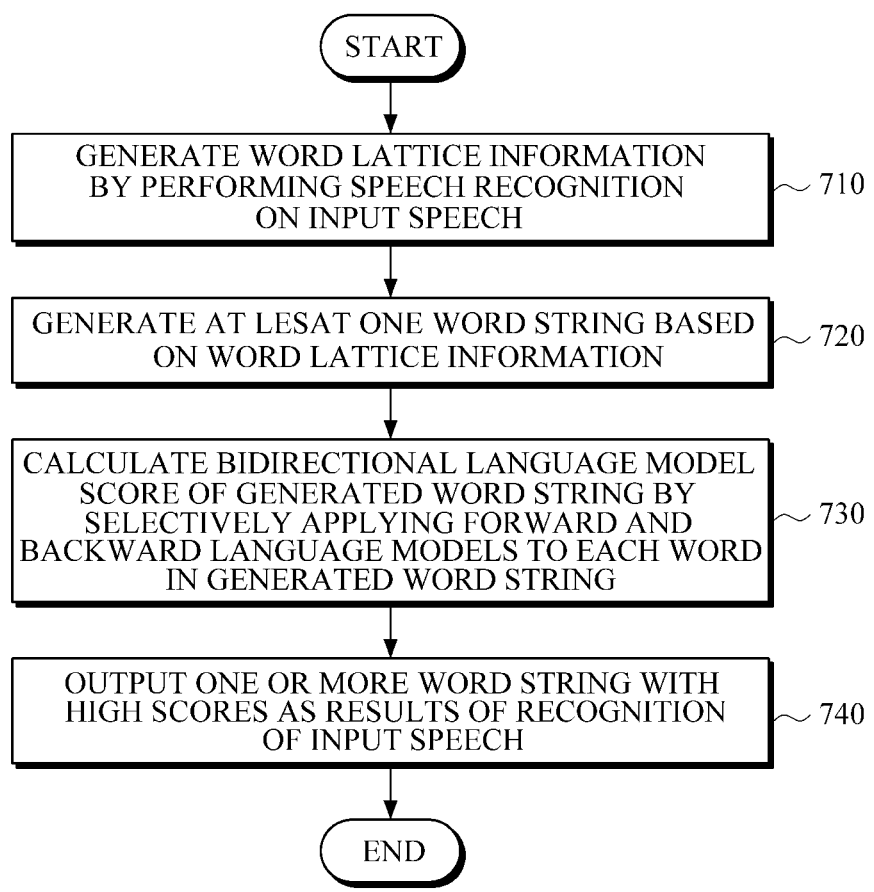
FIG. 7 is a flowchart illustrating an example of a speech recognition method.

FIG. 7 illustrates an example of a speech recognition method. Referring to FIGS. 1 and 7, the speech recognition apparatus 100 may generate word lattice information by performing speech recognition on input speech (710).

The speech recognition apparatus 100 may generate one or more word strings based on the word lattice information (720).

The speech recognition apparatus 100 may calculate bidirectional language model scores of the generated word strings by selectively using the forward and backward language models 160 and 170 for each of the words in each of the generated word strings (730).

The speech recognition apparatus 100 may select one of the forward and backward language models 160 and 170 for each of the words in each of the generated word strings, may calculate the bidirectional language model scores of the generated word strings by applying to each of the words in each of the generated word strings the forward or backward language models 160 or 170 that is selected for the corresponding word.

For example, the speech recognition apparatus 100 may calculate the forward and backward language model scores of each of the words in each of the generated word strings and may select the forward or backward language model scores of each of the words in each of the generated word strings that is higher than the other language model score. Then, the speech recognition apparatus 100 may calculate the bidirectional language model score of each of the generated word strings by adding up the selected language model scores of the words in the corresponding word string.

In response to a predefined condition regarding the application of the forward and backward language models 160 and 170, for example, a condition that the forward or backward language model 160 or 170 be selected for use for particular words or for words having particular morphemes, the speech recognition apparatus 100 may prioritize the predefined condition over language model scores, and may thus select one of the forward and backward language models 160 and 170 according to the predefined condition without regard to the language model scores.

The speech recognition apparatus 100 1) may determine whether there is a cyclic dependency between the words in each of the generated word strings, 2) may remove a cyclic dependency, if any, from each of the generated word strings, and 3) may calculate the language model scores of the words in each of the generated word strings.

For example, in response to a word string including first and second words having a cyclic dependency therebetween, the speech recognition apparatus 100 may calculate the language model score of the word string twice, for example, once using a first method, which involves applying the backward language model 170 to the first word and applying the unigram model to the second word, and once using a second method, which involves applying the unigram model to the first word and applying the forward language model 160 to the second word, and may then select the first or second methods that produces a higher language model score than the other method, thereby removing the cyclic dependency from the word string.

The speech recognition apparatus 100 may output one or more of the word strings with high bidirectional language model scores as results of the recognition of the input speech (740).

The speech recognition apparatus 100 may calculate the acoustic model scores of one or more candidate word strings for the input speech, and may add up the acoustic model scores and the bidirectional language model scores of the candidate word strings, thereby obtaining the integrated scores of the candidate word strings. Then, the speech recognition apparatus 100 may output one or more of the candidate word strings with high integrated scores as results of the recognition of the input speech.

The processes, functions, methods and/or software described herein may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:
1. A speech recognition apparatus comprising:
a primary speech recognition unit configured to perform speech recognition on input speech and thus to generate word lattice information;
a word string generation unit configured to generate one or more word strings based on the word lattice information;
a language model score calculation unit configured to calculate bidirectional language model scores of the generated word strings selectively using forward and backward language models for each of words in each of the generated word strings; and
a sentence output unit configured to output one or more of the generated word strings with high scores as results of the speech recognition of the input speech based on the calculated bidirectional language model scores.
2. The speech recognition apparatus of claim 1, wherein the language model score calculation unit comprises:
a language model selector configured to select one of the forward and backward language models for each of the words in each of the generated word strings; and
a score calculator configured to calculate the bidirectional language model scores of the generated word strings selectively using the forward and backward language models for each of the words in each of the generated word strings.
3. The speech recognition apparatus of claim 2, wherein the language model selector is further configured to calculate forward and backward language model scores of each of the words in each of the generated word strings using the forward and backward language models, respectively, and to select whichever of the forward and backward language models produces a higher language model score for each of the words in each of the generated word strings.

4. The speech recognition apparatus of claim 3, wherein, in response to a predefined condition, the language model selector is further configured to prioritize the predefined condition over the forward and backward language model scores and to select one of the forward and backward language models for each of the words in each of the generated word strings based on the predefined condition.

5. The speech recognition apparatus of claim 4, wherein the predefined condition includes a condition that the forward or backward language model be selected for use for particular words or for words having particular morphemes.

6. The speech recognition apparatus of claim 3, wherein the language model score calculation unit is further configured to calculate the language model score of each of the generated word strings by adding up the forward or backward language model scores of each of the words in the corresponding word string that is selected.

7. The speech recognition apparatus of claim 6, wherein, in response to a word string having a cyclic dependency between first and second words thereof among the generated word strings, the language model score calculation unit is further configured to remove the cyclic dependency between the first and second words and to calculate a language model score of the word string including the first and second words.

8. The speech recognition apparatus of claim 7, wherein the language model score calculation unit is further configured to calculate the language model score of the word including the first and second words using first and second methods, respectively, and select whichever of the first and second methods produces a higher language model score than the other method for the word string including the first and second words to remove the cyclic dependency between the first and second words, the first method including applying the backward language model to the first word and applying a unigram model to the second word, and the second method including applying the unigram model to the first word and applying the forward language model to the second word.

9. The speech recognition apparatus of claim 1, wherein the sentence output unit is further configured to calculate acoustic model scores of the generated word strings in consideration of a liaison between the words in each of the generated word strings, add up the acoustic model scores and the bidirectional language model scores of the generated word strings to calculate integrated scores of the generated word strings, select one or more word strings with high integrated scores from the generated word strings, and output the selected word strings as the results of the speech recognition of the input speech.

10. The speech recognition apparatus of claim 1, wherein each unit is implemented by a processor.

11. The speech recognition apparatus of claim 1, wherein the forward language model includes probability information indicating a probability that a word in a word string will be followed, in a forward direction, by a particular word.

12. A speech recognition method comprising:
generating, at a primary speech recognition unit, word lattice information by performing speech recognition on input speech;
generating one or more word strings based on the word lattice information;
calculating bidirectional language model scores of the generated word strings selectively using forward and backward language models for each of words in each of the generated word strings; and
outputting one or more of the generated word strings with high scores as results of the speech recognition of the input speech based on the calculated bidirectional language model scores, wherein each of the generating, the calculating, and the outputting is performed by a processor.

13. The speech recognition method of claim 12, wherein the calculating the bidirectional language model scores comprises:
selecting one of the forward and backward language models for each of the words in each of the generated word strings; and
calculating the bidirectional language model scores of the generated word strings selectively using the forward and backward language models for each of the words in each of the generated word strings.

14. The speech recognition method of claim 13, wherein the selecting one of the forward and backward language models comprises:
calculating forward and backward language model scores of each of the words in each of the generated word strings using the forward and backward language models, respectively; and choosing whichever of the forward and backward language models produces a higher language model score for each of the words in each of the generated word strings.

15. The speech recognition method of claim 14, wherein the selecting one of the forward and backward language models comprises, in response to a predefined condition, prioritizing the predefined condition over the forward and backward language model scores and selecting one of the forward and backward language models for each of the words in each of the generated word strings based on the predefined condition.

16. The speech recognition method of claim 13, wherein the calculating the bidirectional language model scores of the generated word strings comprises:
determining whether there is a word string having a cyclic dependency between first and second words thereof among the generated word strings;
in response to a word string having a cyclic dependency between first and second words thereof among the generated word strings, removing the cyclic dependency between the first and second words and calculating a language model score of the word string including the first and second words.

17. The speech recognition method of claim 16, wherein the removing the cyclic dependency between the first and second words comprises:
calculating the language model score of the word including the first and second words using first and second methods, respectively, and choosing whichever of the first and second methods produces a higher language model score than the other method for the word string including the first and second words to remove the cyclic dependency between the first and second words, the first method including applying the backward language model to the first word and applying a unigram model to the second word, and the second method including applying the unigram model to the first word and applying the forward language model to the second word.

18. The speech recognition method of claim 12, wherein the calculating the bidirectional language model scores of the generated word strings comprises calculating the language model score of each of the generated word strings by adding up the forward or backward language model scores of each of the words in the corresponding word string that is selected.

19. The speech recognition method of claim 12, wherein the outputting the word strings with high scores comprises:
- calculating acoustic model scores of the generated word strings in consideration of a liaison between the words in each of the generated word strings;
- adding up the acoustic model scores and the bidirectional language model scores of the generated word strings to calculate integrated scores of the generated word strings; and
- selecting one or more word strings with high integrated scores from the generated word strings and outputting the selected word strings as the results of the recognition of the input speech.

20. The speech recognition method of claim 12, wherein the backward language model includes probability information indicating a probability that a word in a word string will be followed, in a backward direction, by a particular word.

* * * * *